Sept. 18, 1923.
F. C. HILL
LICENSE PLATE HOLDER
Filed Aug. 21, 1922
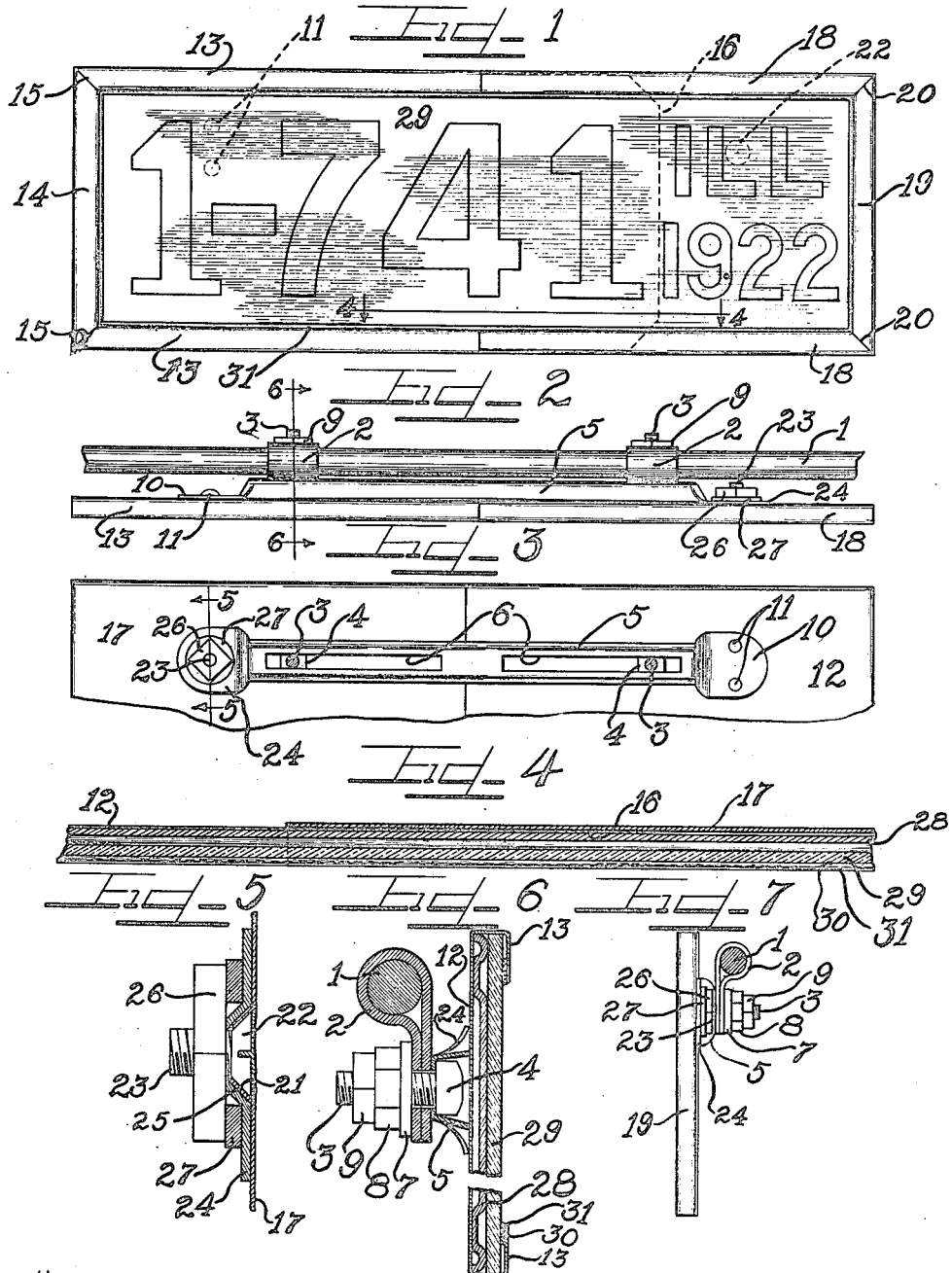

Patented Sept. 18, 1923.

1,468,153

UNITED STATES PATENT OFFICE.

FRANK C. HILL, OF CHICAGO, ILLINOIS.

LICENSE-PLATE HOLDER.

Application filed August 21, 1922. Serial No. 583,167.

*To all whom it may concern:*

Be it known that I, FRANK C. HILL, a citizen of the United States, and a resident of the city of Chicago, in the county of Cook and State of Illinois, have invented certain new and useful Improvements in a License-Plate Holder; and I do hereby declare that the following is a full, clear, and exact description of the same, reference being had to the accompanying drawings, and to the numerals of reference marked thereon, which form a part of this specification.

It has been the custom to mount vehicle license plates on brackets or rails without providing any protection for the license plates which consequently soon become marred and disfigured thereby presenting an ungainly appearance and often making it impossible to read the license number.

This invention therefore relates more particularly to an improved holder for vehicle license plates, whereby license plates may be removably supported in a water and dust proof holder behind a transparent medium so that the license plates will be adequately protected against disfiguration and will present a neat appearance within the holder which greatly adds to the appearance of the vehicle on which it may be mounted.

It is an object of this invention to provide a vehicle license plate holder adapted to be readily mounted on a vehicle with the license plate enclosed and protected.

It is also an object of the invention to provide a vehicle license plate holder adapted to be mounted in place on a vehicle support by means of a bracket member which acts as a means for retaining the holder sections associated with one another.

Another object of the invention is to provide a vehicle license plate holder wherein telescoping frame sections are adapted to be held together to enclose the license plate by means of a mounting bracket connecting the frame sections.

It is furthermore an object of this invention to provide a vehicle license plate holder with a water and dust-proof mechanism for protecting a license plate behind a transparent medium mounted in abutting holder sections.

It is an important object of this invention to provide a simple and inexpensive vehicle license plate holder adapted to be readily mounted on a vehicle to add to the general apparance thereof as well as providing adequate protection for the license plate supported thereby.

Other and further important objects of this invention will be apparent from the disclosures in the drawings and specification.

The invention (in a preferred form) is illustrated in the drawings, and hereinafter more fully described.

On the drawings:

Figure 1 is a front plan view of a license plate holder embodying the principles of this invention.

Figure 2 is a top plan view thereof illustrating a portion of a vehicle support on which the holder is adapted to be supported.

Figure 3 is a fragmentary rear view of the holder showing the supporting tie bracket.

Figure 4 is an enlarged fragmentary detail section taken on line 4—4 of Figure 1.

Figure 5 is an enlarged fragmentary detail section taken on line 5—5 of Figure 3.

Figure 6 is an enlarged fragmentary detail section taken on line 6—6 of Figure 2.

Figure 7 is an end view of the license plate holder.

As shown on the drawings:

The reference numeral 1 indicates a vehicle cross bar or support having spring clamps 2 engaged thereon through the apertured arms of which the screw ends 3 of supporting bolts are adapted to project. The supporting bolts have heads 4 which are slidably engaged in a channel tie bar 5 having aligned longitudinal slots 6 therein through which the screw end 3 of the bolts project. Engaged on each supporting bolt 3 is a washer 7, a nut 8 and a lock nut 9.

Integrally formed on one end of the channel tie bar 5 is a depressed flange or head 10 which is rigidly secured by means of rivets 11 or other suitable means against the rear surface of a license plate holder section embracing a back plate 12, two sides and one end of which are provided with integral frame channels 13 and 14 fitted at 15. Integrally formed on the back plate 12 is an extension plate or flange 16, which, when the holder is assembled, slidably projects into a second holder section adjacent the inner surface of a back plate 17. Two sides and one end of the back plate 17 are provided with integral frame channels 18 and 19 fitted at 20.

Struck from the back plate 17 is a conical boss 21 in which the head 22 of an outwardly projecting screw 23 is rigidly secured by soldering or brazing, or any other suitable means. Integrally formed on the second end of the channel tie bar 5 is a depressed flange or head 24 having an apertured conical boss 25 formed thereon adapted to seat against the plate boss 21, as illustrated in Figure 5. The screw 23 projects outwardly through the boss 25 and has a retaining nut 26 engaged thereon to the outside of a washer 27.

A vehicle license plate 28 is adapted to be enclosed by the holder sections behind a protecting glass 29. The license plate 28 and the glass 29 have the margins thereof enclosed by the frame channels of the holder sections. Disposed between the outer surface of the glass 29 and the edges of the frame channels 13, 14, 18 and 19 is a weatherproofing or dust strip 30 made of rubber or other suitable material and having a bead 31 which overhangs the edges of the frame channels to prevent moisture and dust from entering behind the glass. If desired, the weatherproofing strip 30 may be glued or otherwise secured to the outer surface of the glass 29 before mounting.

The holder is very compact and simple and may be readily asembled by placing the license plate 28 behind the glass 29 in registering position, after which the holder section 17 is slipped over one end of the license plate and glass with the frame channels 18 and 19 overhanging the front face of the glass and closely abutting the bead 31 of the weather strip 30. The second holder section 12 is now slidably engaged over the registering license plate and glass with the extension plate 16 telescoping into the other holder section between the license plate 28 and the inner surface of the back plate 17 as shown in Figure 4. The holder sections are now pushed together to abut one another to completely enclose the license plate.

The mounting screw bolts 3 are engaged through the tie bar slots 6 with the heads 4 seated in the channel tie bar. With the holder sections abutting one another as described, the apertured tie bar head 24 is in position to permit the apertured boss 25 thereof to engage over the screw 23, after which the washer 27 and the nut 26 are secured in place to rigidly hold the license plate holder sections secured together, as illustrated in Figure 3.

The mounting screws 3 are slidably adjusted or separated to permit the same to be projected through the supporting clamps 2 on the vehicle rod 1. The washers 7 and the nuts 8 and 9 are secured on the screws 3 to rigidly hold the license plate holder secured in position on the vehicle.

If desired, the holders may be made of aluminum or nickeled metal, or said holder may be enameled any desired color to conform to the color of the vehicle on which the holder is to be mounted.

I am aware that many changes may be made, and numerous details of construction may be varied through a wide range without departing from the principles of this invention, and I therefore do not purpose limiting the patent granted hereon, otherwise than necessitated by the prior art.

I claim as my invention:—

1. A vehicle license plate holder comprising a pair of overlapping frame plates, abutting frame channels thereon, a slotted tie bar rigidly connecting said plates, and means carried by the slotted tie bar for mounting the holder.

2. A vehicle license plate holder comprising a pair of abutting frame sections, an extension member on one of said sections adapted to project into the other section, and a mounting bar rigidly secured to one section and removably secured to the other section for rigidly holding the frame sections connected.

3. A vehicle license plate holder comprising a pair of abutting frame sections, an extension on one of said sections, projecting into the other section, a slotted tie bar rigidly secured to one section and overlapping the other section, mounting members supported by the slotted bar, and means rigidly secured on said other section adapted to be removably engaged by said tie bar to hold the frame sections rigidly connected.

4. A vehicle license plate holder comprising a pair of abutting frame sections adapted to hold a license plate, a glass in said holder covering the license plate to protect the same, water and dust proof means disposed between said glass and the frame sections, and mounting means rigidly secured to one frame section and removably connected to the other frame section for connecting said frame sections.

5. A vehicle license plate holder comprising a pair of interfitting frame sections adapted to hold a license plate, means in the holder for covering the license plate to protect the same, means connecting the frame sections, said means having one end rigidly secured to one of said frame sections and the other end removably connected to the other of said frame sections, and mounting means adjustably supported on said connecting means.

6. A vehicle license plate holder comprising a pair of overlapping plates, frame channels integrally formed on said plates and abutting one another, and means secured to one of said plates for removably connecting said plates.

7. A vehicle license plate holder comprising a pair of overlapping plates, frame channels integrally formed on said plates and abutting one another, a glass held in place by said abutting frame channels, weatherproofing strips on said glass and engaging said frame channels, a tie bar having one end rigidly secured to one of said plates, means for removably securing the other end of said tie bar to the other of said plates, and mounting means supported on said tie bar to permit the holder to be supported on a vehicle.

In testimony whereof I have hereunto subscribed my name in the presence of two subscribing witnesses.

FRANK C. HILL.

Witnesses:
FRED E. PAESLER,
OSCAR HARTMANN.